United States Patent [19]

Mazelsky

[11] 4,128,217
[45] Dec. 5, 1978

[54] SYSTEM FOR ISOLATING FLOOR VIBRATION AND DISTORTIONS FROM AN OBJECT SUCH AS AN AIRCRAFT SEAT

[75] Inventor: Bernard Mazelsky, West Covina, Calif.

[73] Assignee: ARA, Inc., West Covina, Calif.

[21] Appl. No.: 817,982

[22] Filed: Jul. 22, 1977

[51] Int. Cl.² .............................................. B64D 25/04
[52] U.S. Cl. ................................ 244/122 R; 188/1 C; 297/216
[58] Field of Search .................... 244/122 R; 297/216; 188/1 C

[56] References Cited

U.S. PATENT DOCUMENTS

| | | | |
|---|---|---|---|
| 2,301,903 | 11/1942 | Flader | 244/122 R X |
| 2,401,748 | 6/1946 | Dillon | 188/1 C X |
| 2,971,566 | 2/1961 | Negroni | 244/122 R X |
| 3,059,966 | 10/1962 | Spielman | 244/122 R |
| 3,228,492 | 1/1966 | Blumrich | 188/1 C |

Primary Examiner—Barry L. Kelmachter
Attorney, Agent, or Firm—Albert M. Herzig; Edward C. Walsh

[57] ABSTRACT

A support system for an object such as a crashworthy aircraft crew seat which is floor mounted will isolate the seat from floor distortions as well as floor vibrations which would otherwise be introduced into the seat. The floor distortions occur only during a severe crash or impact. The floor vibrations occur continuously during normal flight as well as during maneuvers which could increase or decrease from a nominal level of relatively high G forces as they are transmitted from the floor. The invention provides a plurality of vibration and distortion isolating units from which the chair is supported at a plurality of points. The isolation units are circular holding members made of resilient material with crushable metal inserts in the resilient material. Supporting pins or members pass through the metal inserts in the isolation units. The isolation units are carried by rail guides constructed to translate along rails. The isolation units provide the capability of plus or minus 10° of bending movement of a rail or plus or minus 10° of twisting movement of a rail which movements are isolated from the chair.

9 Claims, 11 Drawing Figures

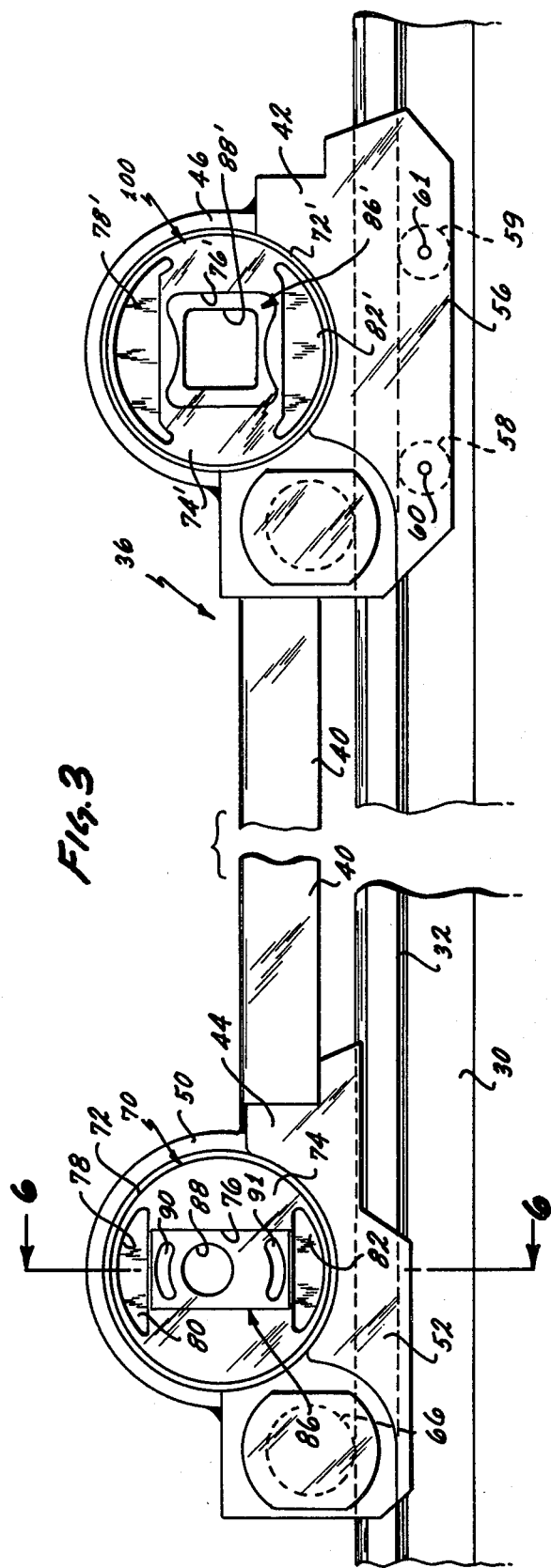
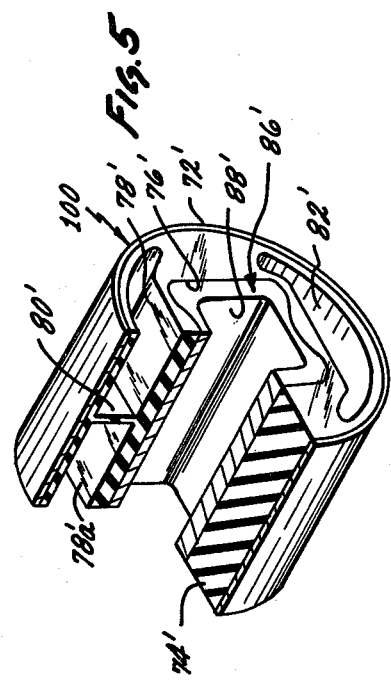
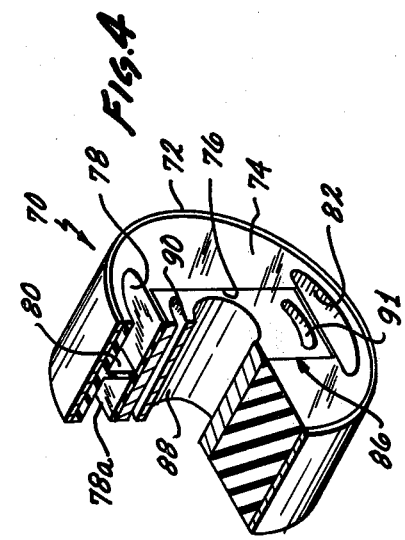

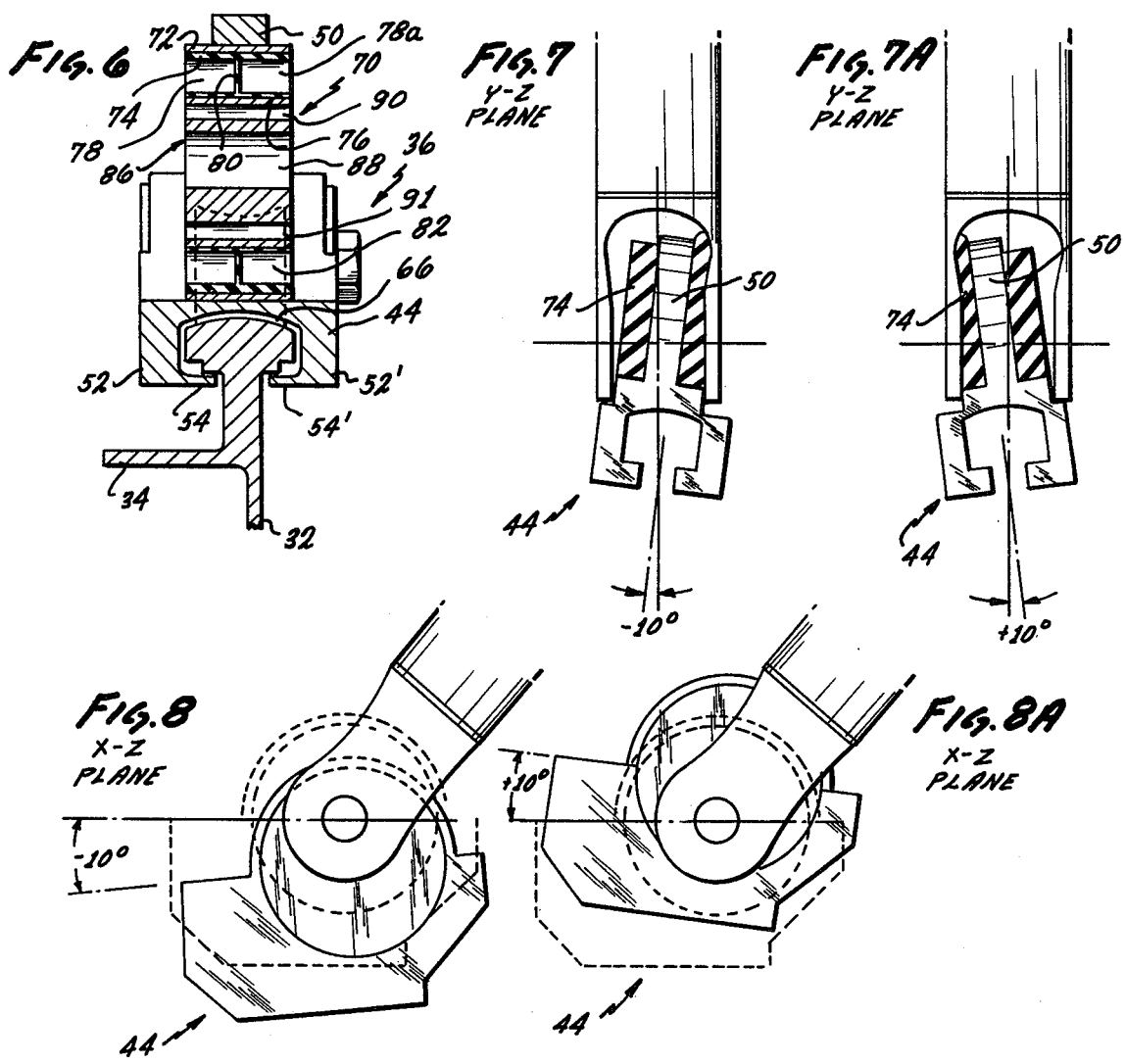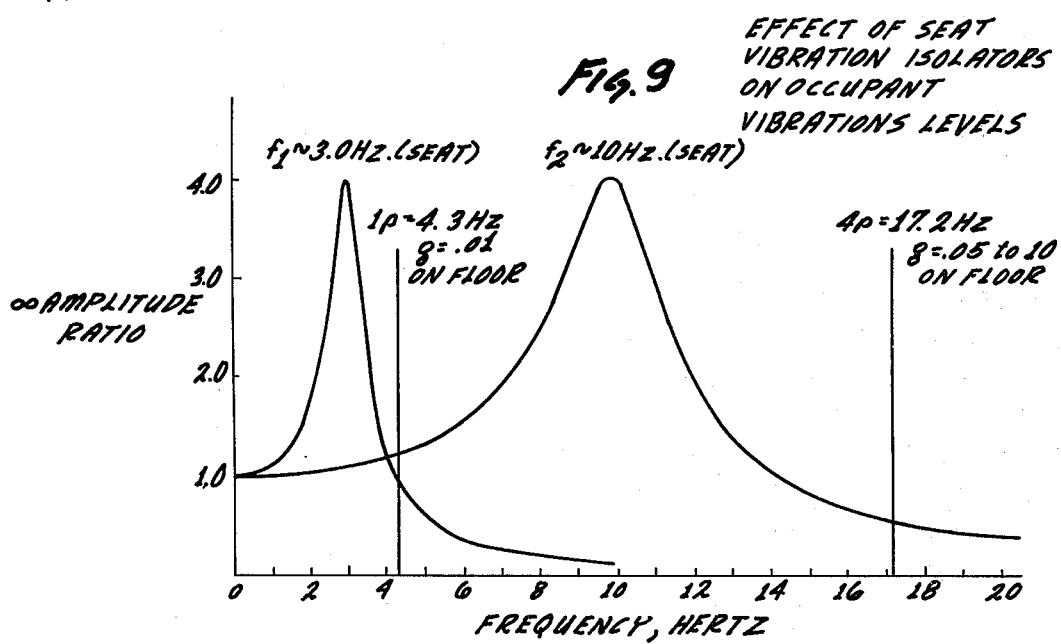

SYSTEM FOR ISOLATING FLOOR VIBRATION AND DISTORTIONS FROM AN OBJECT SUCH AS AN AIRCRAFT SEAT

BACKGROUND OF THE INVENTION

1. Field of the Invention

The field of the invention relates to the mounting or support of objects and, more particularly, chairs or crew seats in an aircraft having means to isolate the chair or seat from floor distortion in a crash or severe impact and from vibrations during normal flight conditions.

2. Description of the Prior Art

Knowledge is presently not available of any prior art having capabilities similar to that of the herein invention.

SUMMARY OF THE INVENTION

This crew seat is a typical configuration wherein a bucket is used to hold the occupant during normal flight conditions. During a crash, a set of attenuators is used to limit the loads and forces on the occupant by the activation of the attenuators. The attenuators are connected to a support carriage which in turn is set on a pair of rail guides, which traverse rails that are considered to be a part of the floor structure. During the crash the floor structure and consequently the rails which are rigidly attached to the structure can distort due to the deformations of the floor during impact. The invention provides that in general one of the rails can distort as much as plus or minus 10° in twist while the other rail can bend as much as plus or minus 10° in bending. When such an impact occurs, these floor distortions should not inhibit the seat from attenuating during the crash and in addition, should not permit the seat from disengaging the rails during the crash. In order to satisfy the floor warpage requirements, a special rail guide is provided to allow these distortions of the floor and the rail to exist without inhibiting the attenuation of the seat. In addition, the rail guide stays fully engaged to the rail during the crash.

The second requirement for the seat is to provide, with the same rail guide assembly, a means of isolating the vibrations of the floor from the upper part of the seat which retains the occupant. For the Sikorsky/UTTAS aircraft, for example, the lowest frequency that is felt on the floor is a 4.3 hz. where, at this frequency, the vibration load on the floor is approximately $g=0.01$ on the floor. Since this aircraft has four rotor blades, the next frequency is a multiple of 4.3 hz. $\times$ 4 which results in a frequency of 17.2 hz. For this vibration condition, the vibratory acceleration level on the floor is approximately $g=0.05$ to 0.10. The vibratory g levels on the floor can vary depending on the maneuvering condition of the aircraft. Obviously, a helicopter must climb rapidly, descend rapdily, or "flare," as well as make severe turns. These maneuvers do effect the level of vibration from the rotor blades to the floor. For a successful vibration isolation system, it is essential that the seat's natural frequencies, as they are installed in the aircraft with the occupant, result in frequencies of the seat that are different than the floor vibration frequencies. The invention provides vibration isolators located in the rail guides such that the natural vibration seat frequencies can be made to be different than the floor frequencies. Since the natural frequencies of the seat can be more than one, the design is arranged to accommodate a typical set of seat natural frequencies. Due to the large mass and inertial coupling of the seat-man combination with the vibration isolators, the natural frequencies of the seat are highly coupled. A vibration analysis of an exemplary seat was made using typical vibration isolators in the rail guides. The results of this analysis indicate typical vibration isolators in the rail guides. The results of this analysis indicate that the first two coupled symmetric natural frequencies are approximately 3 hz. and 10 hz. for the Sikorsky/UTTAS Crashworthy Armored Seat configuration.

When the natural seat frequencies are plotted on the same graph with the vibration frequencies of the aircraft, and when the seat is subject to the vibration g levels of the floor at the aircraft floor frequencies, it has been found that the amplification of the seat at 4.3 hz and at 17.2 hz. will never exceed an amplitude ratio of 1.2.

By regulating this amplitude ratio, especially at the frequencies of 17.2 hz. where the largest floor acceleration levels of $g=0.05$ to 0.10 exists, maximum vibration isolation of the seat from the floor exists.

To accommodate specified seat required characteristics, a means of meeting these requirements is provided by the invention. The rail guide consists of a forward part and a rearward part with rollers and bearings to allow the rail guide to slide readily over the rail in an effective manner. There is a pin on the rail guide with a handle which allows the rail guide to lock itself into the rail at a desired horizontal position. Basically, an individual isolation unit consists of aluminum inserts of a prescribed shape, molded in a rubber-like material to a thin metal circular cylinder which can be inserted into the rail guide assembly. This circular member has openings which are used to deform or allow movement of the pin connecting the carriage assembly to the rail guide assembly. As the floor vibrates to move the rail guide, the pin connecting the carriage assembly to the rail guide remains essentially in a stationary position. For large floor distortions that would occur during a crash, this rail guide can move as much as plus or minus ⅛" vertically as well as twist plus or minus 10° in rotation with respect to the pins connecting the carriage assembly to the rail guide such that the carriage assembly would remain basically undisturbed while this deformation or movement occurs.

The shape of the forward and rearward parts of the vibration isolation units are different because different spring constants are required to ensure that the frequencies of the seat can be properly determined so that they can be as far removed from the floor vibration frequencies as possible. During normal flight the displacement of the pins connecting the carriage assembly to the rail guide assembly have relatively small displacements and, consequently, the life of the vibration rubber isolators would last for the required number of hours to minimize maintainability requirements.

For the forward vibration isolator, slots are made in the metal insert to ensure that adequate displacement of the pin will occur for both floor bending and floor rotation. In other words, the metal insert is designed to crush by the pin due to the rail and floor distortions while the carriage remains intact. Large deformations of the forward and rearward pins through the isolators are possible without exerting forces on the clevises and the remaining portions of the carriage. The welded rings supporting the vibration isolators that are on the rail guide are sufficiently small in width to allow for the rotation of the floor, rail, and rail guide to exist up to 10° in twist.

With this arrangement as described, a seat system can be realized to meet the specified requirements without penalizing the aircraft attenuation system, since all distortions of the floor due to impact or vibration levels are isolated from the seat system and the crewmen.

In the light of the foregoing, the primary object is to make it possible to realize effective means for isolating an object such as a chair or seat in an aircraft mounted on the floor from distortions of the floor and vibrations.

A further object is to provide vibration and distortion isolation means for a chair or the like in the form of members made of resilient material having crushable inserts embedded in the material, the inserts having openings to receive the support means whereby the resilient material allows displacement due to floor vibrations and the crushability of the inserts isolates the support members from floor distortions due to a crash or other heavy impact.

A further object is to provide an isolation unit as in the foregoing wherein the rectangular material is of cylindrical configuration within a metal holding band, the resilient material and the insert having axial openings to facilitate the isolation of vibrations and floor distortions.

Further objects and additional advantages of the invention will become apparent from the following detailed description and annexed drawings.

BRIEF DESCRIPTION OF THE DRAWINGS

FIG. 3 is a side elevation of one of the rail guides and rails of FIG. 2;

FIG. 4 is a cut-away isometric view of another of the vibration isolation units;

FIG. 5 is a cut-away isometric view of another of the vibration isolation units;

FIG. 6 is a cross-sectional view taken along the lines 6—6 of FIG. 3;

FIG. 7 and 7A are illustrative views illustrating the action of the vibration isolation units in the Y-Z plane of floor warpage;

FIGS. 8 and 8A are illustrative views illustrating the action of the vibration isolation units during floor distortion in the X-Z plane;

FIG. 9 is a graph of amplitude versus frequencies illustrating the effect of seat vibration isolators on occupant vibration levels.

BRIEF DESCRIPTION OF THE PREFERRED EMBODIMENTS

Figure 1:
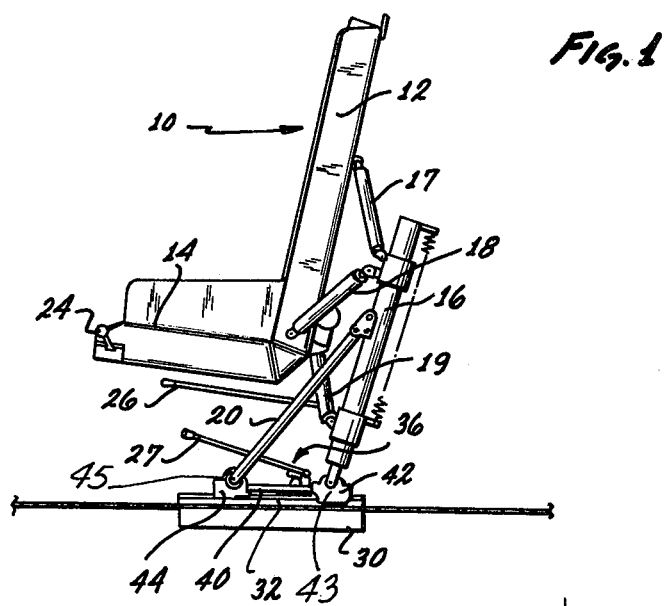
FIG. 1 is a side elevation of an aircraft crew seat mounted from the floor of an aircraft and having the invention embodied therein.

FIG. 1 illustrates exemplarily a type of aircraft seat in which the invention may be embodied in a vehicle as, for example, a particular type of aircraft. The seat itself is designated by the numeral 10, the seat having a back 12 and a seat portion 14. One side of the seat is shown. The supporting members include an upright member 16 which itself may be an energy absorbing or dissipating device. The seat is supported from this member by way of further energy absorbing or dissipating devices 17, 18 and 19 which may be of a type known in the art and as referred to in the previous application referred to. Numeral 20 designates a brace member. The attachments at the ends of the energy absorbers and brace member may be of a ball and socket type or otherwise as described in the previous application. Numeral 24 designates an inertial reel locking handle and numerals 26 and 27 designate handles such as will be referred to again presently. Numeral 30 designates a portion of a beam supporting one of a pair of rails on which the seat is carried as will be described in detail.

Figure 2:
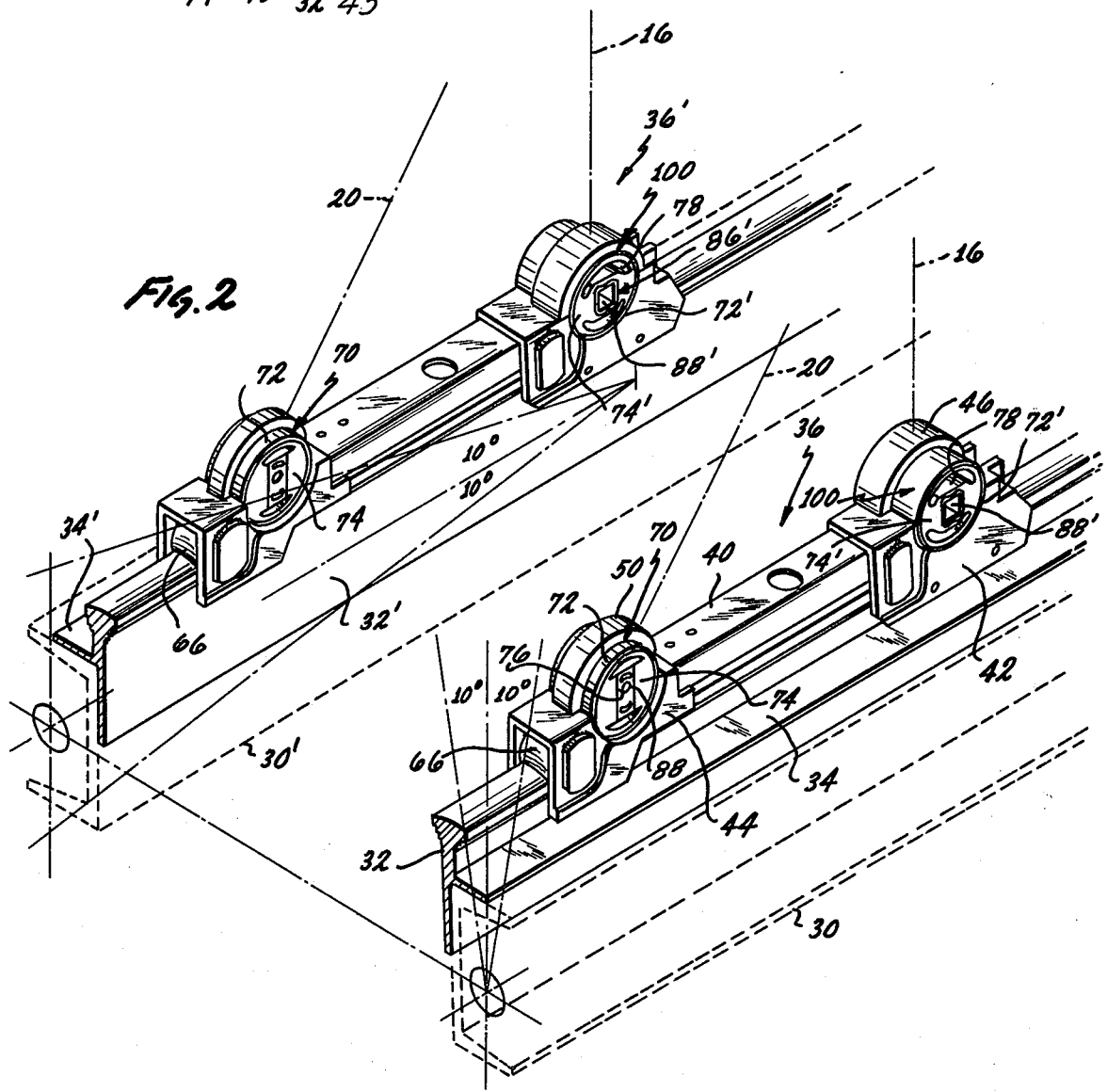
FIG. 2 is a detail isometric view of the rail guides and rails for the seat of FIG. 1.

Referring to FIGS. 2–8 numerals 30 and 30' designate a pair of beams which are part of the aircraft structure which support parallel rails 32 and 32' having a more or less typical configuration as shown in FIG. 2, these rails having flanges as shown at 34 and 34' which are supported on the beams 30 and 30'. Numerals 36 and 36' designate a pair of rail guide assemblies. The chair 10 is supported from these assemblies. Since they are alike, only one will be described in detail. FIG. 3 is a side elevation of the assembly 36.

The rail guide 36 includes an intermediate beam part 40 of a box-like configuration with an end housing part 42 at one end and an end housing part 44 at the other end. These housings have a configuration as shown so as to fit down over the rail 32. Housing 42 has a generally circular circularly configured part 46 shaped to receive a cylindrical insert. Housing part 44 has a similarly circularly shaped part 50 adapted to receive a circular insert.

The housing portion 44 is shown in cross-section in FIG. 6. It has side parts 52 and 52' having inwardly extending flanges 54 and 54' which extend underneath the upper widened part of the rail 32 as shown. Its portion 50 received a circular vibration isolating unit such as will be described presently.

The housing 42 has side portions similar to those of the housing portion 44, besides however, being of greater depth such as is indicated at 56 in FIG. 3. The side portion 56 carries a pair of rollers 58 and 59 on axles 60 and 61 which rollers engage underneath the overhang on one side of the upper part of the rail 32. The construction on the opposite side of the housing 42 is the same and thus, it can be seen that the guide rail assembly is securely held to the guide rail.

At the forward part of the housing 42 mounted between its sidewalls is a roller 66 having a cross-sectional contour so as to be congruent with the top surface of the rail 32 on which it rides. This roller is mounted on a bolt between the sidewalls 52 and 52' of the housing 44. A similar roller is provided mounted between the sidewalls at the front part of the housing 46.

Handle 26 can lock the chair 10 in a fixed vertical position and handle 27 can lock horizontal translating movement of the chair along its supporting rails.

From the foregoing, it will be understood that the two guide rail assemblies are alike. The chair 10 is supported from them at four points as will be described so that the chain can translate linearly along the two rails.

FIG. 4 illustrates a vibration isolation unit designated as 70 which is cylindrical and which mounts within the cylindrical opening in the part 50 of housing 44. The unit 70 includes a cylindrical metal band 72. Within this band is an insert member made of resilient material such as rubber as designated at 74. The insert 74 has a vertical rectangular opening in it as designated at 76. This opening extends all the way through the insert. At the upper end of this opening, there is an opening in the rubber insert having a shape as designated at 78, the opening being flat on the inside and curved on the outside. There is a similar opening 78a on the opposite side of the rubber insert with a narrow web or material 80 remaining between these openings. There are similar openings in the insert at the opposite side of the opening 76, one of which is designated at 82.

Within the opening 76 is a crushable metal insert member as designated at 86. This insert member has a circular bore 88 to receive a retaining pin means 45. See FIG. 1. On opposite sides of the bore 88, there are openings extending in a direction parallel to the axis, these openings being of arcuate cross-sectional configuration as designated at 90 and 91. The operation or action of the vibration insert unit 70 will be described presently.

FIG. 5 shows another vibration insert unit 100. This unit is similar to the unit 70 except as will be described. Corresponding parts are identified by the same reference characters primed. The openings 78' and 82' are of slightly different cross-sectional configuration as may be seen. The opening 76' in the resilient insert 74' is square in cross-section rather than being a circular bore. The crushable insert 86' which may be made of material such as aluminum, is square in cross-section and it has a bore 88' which is square in cross-section instead of having a circular bore as in the unit 70. It receives pin 43. See FIG. 1.

As is apparent, there are two of the units 70 and two of the units 100, one of each carried by each of the rail guides 36 and 36'. It will be understood that the bores 88 and 88' in the units receive transverse mounting pins from which are supported supporting members for the chair such as the members 16 and 20 on one side and similar members on the opposite side.

The function of the vibration isolating unit is illustrated in FIGS. 7 and 7A and FIGS. 8 and 8A. Floor distortions or deformations are able to cause movement of the above described units which connect the carriage assembly of the chair to the rail guide assemblies, the capability being present of this deformation occurring without it being transmitted to the carriage assembly, that is, to the chair. FIGS. 7 and 7A illustrate the action of the vibration isolating units resulting from twisting action of the rail, these figures showing twisting action of plus or minus 10°. As may be seen, the rubber inserts 74 and 74' are able to deform sufficiently to allow these degrees of twisting. In other words, the chair is isolated from the vibrations and/or deformations. That is, the pins connecting the carriage assembly to the rail guides remain essentially in a stationary position. For large floor distortions that would occur during a crash, the pins can move as much as plus or minus one-half inch vertically, that is, in a bending mode as well as being able to twist plus or minus 10° in rotation in a twisting mode, the carriage assembly remaining basically undisturbed while these deformations occur. The aforesaid pins may be transverse arbors or shafts at the ends of members 16 and 20 in FIG. 1.

The forward and rearward or aft vibration isolation units are different because different spring constants are required to ensure that the frequencies of the seat can be properly determined or related so that they can be as far removed from the floor vibration frequencies as possible. During normal flight, the displacement of the pins connecting the carriage assembly to the rail guide assemblies have relatively small displacements and consequently, the life of the vibration rubber isolators or members as shown in FIGS. 4 and 5 would last for the required number of hours to minimize maintainability requirements.

If the vibration isolating units shown in FIGS. 4 and 6 are not tuned to the exact frequencies required to obtain maximum isolation from the floor frequencies, it should be noted that the resilient members 74 which are cylinders can be rotated such that the spring constants of either or both of the front and rear isolators would vary slightly to change the natural frequencies of the seat. This is possible since the stiffness of the vibration isolators in the up and down direction is approximately one-fourth the stiffness of the vibration isolators in the fore and aft direction. Since the force of the clevises which connect the remaining carriage assembly to the rail guide assembly direct their forces in a prescribed direction which is illustrated by the configuration shown in the figures, small but significant changes in seat frequencies can be specified by relatively simple changes in the rotational positions of the vibration isolators and the rail guide assemblies.

For the forward vibration isolation units, slots are made in the metal inserts as described to ensure that adequate displacement of the pin will occur for both floor bending and floor rotation. In other words, the metal insert is designed to crush by the pin due to the rail and floor distortions while the carriage remains intact and stable. Large deformations of the forward and rearward pins through the isolators are made possible without exerting forces on the clevises and the remaining portions of the carriage. The welded rings supporting the vibration isolators that are on the rail guides are sufficiently small in width to allow for the rotation of the floor rail and rail guides to exit up to 10° in twist. See FIGS. 7 and 7A.

With the arrangement as described, a seat system can be realized to meet the requirements depicted in FIG. 9 without penalizing the aircraft attentuation system since all distortions of the floor due to impact or vibration levels are isolated from the seat system and the crew men.

FIG. 8 illustrates deformation of the rail in a bending mode, that is, in the X-Z plane that is a bending mode. Whereas the retaining pins can be displaced as shown with the metal inserts crushing, the seat carriage itself is isolated from the deformation.

FIG. 9 is an illustration of a typical vibration versus frequency response of an aircraft as previously referred to. The chart graphically illustrates the effect of the seat vibration isolators on occupant vibration levels. The chart is typical and illustrative for the exemplary aircraft previously referred to, namely Sikorsky/UTTAS.

From the foregoing, those skilled in the art will readily understand the nature of the invention, the manner of its utilization and the manner in which it achieves and realizes all of the objects as set forth in the foregoing.

The foregoing disclosure is representative of a preferred form of the invention and is to be interpreted in an illustrative rather than a limiting sense, the invention to be accorded the full scope of the claims appended hereto.

What is claimed is:

1. An assembly having mounting means for an object in an air vehicle supported from the floor of the vehicle for isolating the object from floor vibrations and distortions, in combination, at least one unit which includes a member made of resilient material with a holder therefor, an insert embedded in the resilient material having an opening extending through said insert to receive support pin means, the resilient material being sufficiently resilient to allow limited movement of the mounting means relative to the pin means for isolating vibrations from the object, and the material of the insert being crushable so that said insert may be crushed by distortional movements of the mounting means with isolation of said movements from the object.

2. An assembly as in claim 1 wherein said at least one unit comprising a plurality of units, the said object being an aircraft seat, the seat being supported from said pin means at spaced points.

3. An assembly as in claim 1 wherein said at least one unit comprising a plurality of units there being pairs of said units positioned in longitudinal alignment with respect to the longitudinal dimension of the vehicle, a pair of rail members on which the units are supported, the said resilient member and insert of each unit being constructed to allow twisting distortion of one of the rail members while at the same time allowing bending distortion of the other one of said rail members.

4. An assembly as in claim 1 wherein the opening through said insert is a round bore.

5. An assembly as in claim 1 wherein the opening through said insert is of non-circular cross-section.

6. An assembly as in claim 3 including roller means cooperating with the rail members.

7. An assembly as in claim 1 wherein the holder is cylindrical, the resilient material being cylindrical within the holder.

8. An assembly as in claim 1 wherein the insert has axial openings extending through said insert to facilitate crushability.

9. An assembly as in claim 8 wherein the insert is of rectangular cross-sectional configuration said openings including an axial opening through the center with axial openings on opposite sides of the center opening.

* * * * *